March 15, 1966 R. F. WOODCOCK ETAL 3,240,105
METHOD OF MAKING AN INFRARED IMAGE TRANSMITTING DEVICE
Filed Aug. 16, 1960
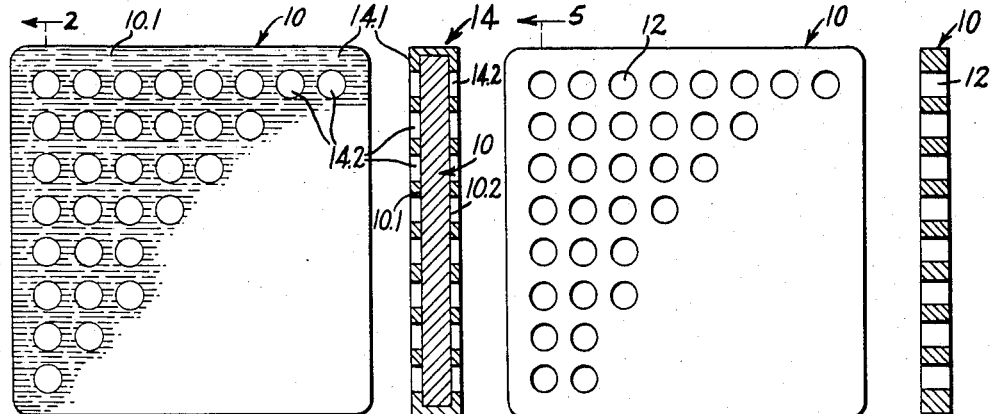
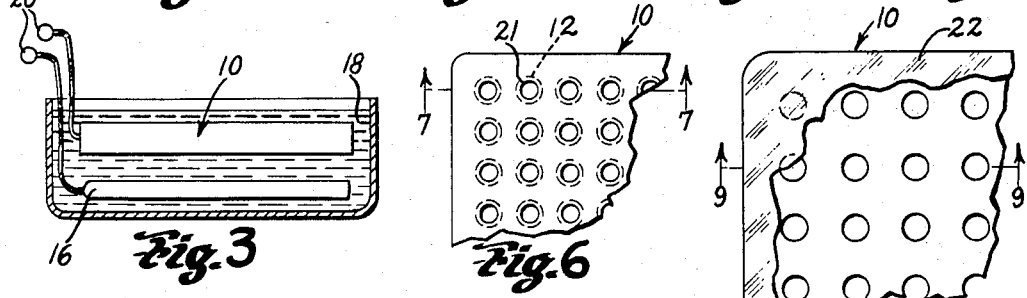
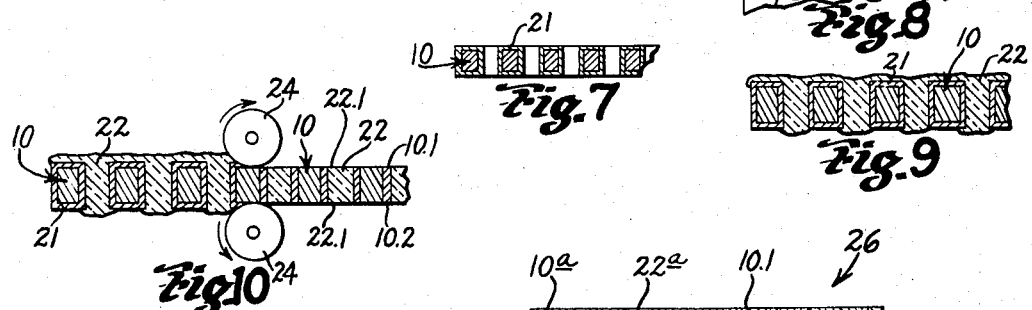
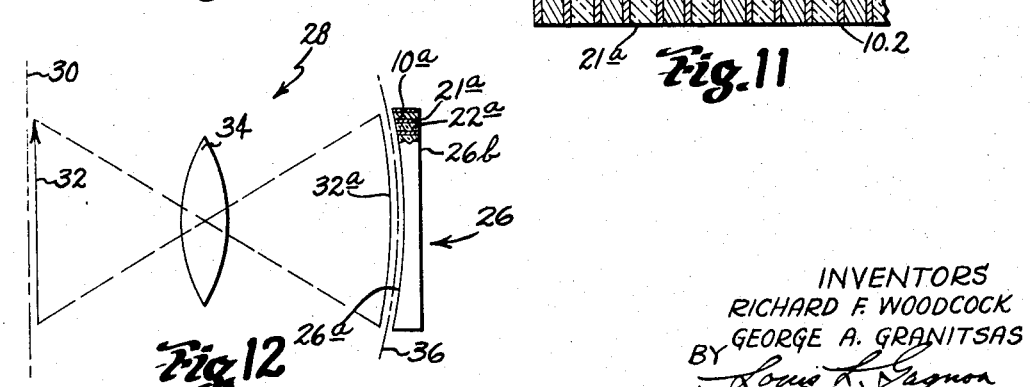
INVENTORS
RICHARD F. WOODCOCK
GEORGE A. GRANITSAS
BY
ATTORNEYS

3,240,105
METHOD OF MAKING AN INFRARED IMAGE TRANSMITTING DEVICE
Richard F. Woodcock, South Woodstock, Conn., and George A. Granitsas, Marlboro, Mass., assignors to American Optical Company, Southbridge, Mass.
Filed Aug. 16, 1960, Ser. No. 49,914
5 Claims. (Cl. 88—1)

The field of this invention is that of image transmitting devices and the invention relates, more particularly, to a novel and improved device and method of manufacturing a device for transmitting an image projected by means of infra-red energy.

Certain image transmitting devices previously known have included a multiplicity of fiber-like light-conducting members having light-insulated coatings and have been arranged with the members in spaced, side-by-side bundled relation to form mosaic, image-receiving and transmitting faces at each of the device ends. In these devices, the fiber-like members have embodied light or energy transmitting materials of relatively high index of refraction and have been coated with materials of relatively low index of refraction so that individual members have been adapted to receive light at one end of the device from respective portions of a light image and have been adapted to transmit such light therethrough in accordance with well known principles of internal reflection to form a transmitted mosaic image upon the face at the other end of the device. Through the use of a large number of small, closely-spaced, fiber-like members in these devices, it has been possible to achieve transmitted images of high resolution, and the member coatings, in preventing optical interaction or light transmission between adjacent members and in preventing absorption of light by matrix materials holding the members in spaced relation, have permitted transmission of images of suitable clarity and contrast.

In order to provide efficient image transmission with such devices, it has been found that the fiber-like members should have smooth, reflective, peripheral surfaces, the fiber-like members and their light-insulating coatings should be in contact over the entire peripheral surfaces of the members, and a large number of such members should be closely-spaced and securely mounted in side-by-side relation. However, it has sometimes been difficult to provide and assemble members and coatings of materials having the desired indices of refraction while achieving the above-noted conditions required for satisfactory image transmission. This has been true, particularly, where materials forming the fiber-like members and coatings have been selected for restricting image transmission primarily to images projected by means of infrared energy.

It is an object of this invention to provide a novel and improved image transmitting device; to provide such a device having a multiplicity of fiber-like image transmitting members each of which is provided with a securely-attached, optically-insulating coating; to provide such a device having a multiplicity of relatively small fiber-like image transmitting members which are securely mounted in side-by-side relation within a matrix; to provide such a device in which a multiplicity of fiber-like members are held in spaced side-by-side relation within a matrix and wherein each of the members has an optically-insulating coating comprising a compound of the material forming said matrix; to provide such a device which is of inexpensive construction; and to provide such a device which is especially adapted for transmitting an image projected by means of infra-red energy.

It is a further object of this invention to provide a novel method of making an image transmitting device of the type wherein a multiplicity of fiber-like image transmitting members are assembled in side-by-side relation within a matrix, each member having an optically-insulating coating; to provide an inexpensive and novel method of making such a device which is especially adapted for transmitting an image projected by means of infra-red energy; and to provide a method of making such a device wherein the coatings of said fiber-like members are securely attached thereto and wherein the members are securely mounted in closely spaced relation within a matrix.

Briefly described, the image transmitting device provided by this invention includes a plate, such as a metallic plate of aluminum, magnesium or other suitable material, having a multiplicity of smooth-walled perforations extending therethrough. The plate perforations have linings or coatings therein adhering to the walls of the perforations, the linings or coatings embodying a light or electromagnetic-energy transmitting material, such as aluminum or magnesium oxide, comprising a compound of the plate material. The device further includes a light or electromagnetic-energy transmitting material, preferably a glass material having a high arsenic content such as arsenic trisulfide glass, for filling the plate perforations. According to the invention, the material filling the plate perforations has a refractive index which is higher than that of the material lining the perforations, and preferably the filling material has transmittance properties which are primarily restricted to the infra-red region of the electromagnetic spectrum. Preferably, also, the materials lining and filling the plate perforations have thermal expansion characteristics corresponding to those of the plate material. Most advantageously, the material filling the plate perforations is optically finished at each end of the plate perforations for facilitating the reception of light, infra-red or other electromagnetic energy therein.

The method of making such a device according to this invention includes the steps of providing a plate, such as an aluminum or magnesium plate or a plate of other suitable material, having a multiplicity of smooth-walled perforations therethrough. For example, such a plate can be provided by photoengraving an aluminum or magnesium plate having a pair of opposed surfaces for forming a multiplicity of perforations which extend between the plate surfaces and by treating the plate for smoothing the inner walls of the plate perforations. The method also includes the step of treating the plate for lining the smooth inner walls of the plate perforations with a light or electromagnetic-energy transmitting material comprising a compound of the plate material. For example, a perforated aluminum plate can be anodized for coating the walls of the plate perforations with aluminum oxide. The method includes the additional step of filling the plate perforations with a light or electromagnetic-energy transmitting material which has a refractive index higher than that of the material lining the plate perforations, the filling material preferably comprising a glass material of high arsenic content such as arsenic trisulfide glass having transmittance properties which are primarily restricted to the infra-red region of the electromagnetic spectrum and having thermal expansion characteristics corresponding to those of the coated plate. The method also includes the step of abrading the opposed plate surfaces for optically finishing the material filling the plate perforations at each end of the perforations to facilitate reception of light, infra-red or other electromagnetic energy therein.

Other objects and advantages of the image-transmitting device and of the methods of making such a device according to this invention will appear in the following description of preferred embodiments of the device and preferred manufacturing methods therefor, the description referring to the drawings wherein:

FIG. 1 is a plan view of the aluminum plate incorporated in the device provided by this invention, the plate being illustrated as it would appear following the initial steps of device manufacture;

FIG. 2 is a section view along line 2—2 of FIG. 1;

FIG. 3 is a diagrammatic view illustrating a subsequent step in manufacture of the device;

FIG. 4 is a plan view of the plate of FIG. 1 as it would appear following further subsequent steps in manufacture of the device;

FIG. 5 is a section view along line 5—5 of FIG. 4;

FIG. 6 is a partial plan view of the plate of FIG. 1 as it would appear following further subsequent steps in manufacture of the device;

FIG. 7 is a section view along line 7—7 of FIG. 6;

FIG. 8 is a partial plan view of the plate of FIG. 1 as it would appear following further subsequent steps in manufacture of the device;

FIG. 9 is a section view along line 9—9 of FIG. 8;

FIG. 10 is a diagrammatic view similar to FIG. 9, illustrating the final step of device manufacture according to this invention;

FIG. 11 is a partial section view, similar to FIG. 2, of the image-transmitting device provided by this invention; and FIG. 12 is a diagrammatic view illustrating the device provided by this invention incorporated in an optical system for flattening the field of an image projected through the system by means of infra-red energy.

Referring to the drawings, 10 in FIGS. 1–10 indicates a thin plate which forms an important part of the image transmitting device provided by this invention, the plate preferably comprising an aluminum plate having opposed sides or surfaces 10.1 and 10.2. For use of the plate as a field flattener as is hereinafter described, the plate surfaces are flat or are provided with suitable curvatures as will be explained below, but it should be understood that the plate surfaces could be flat and parallel or could be otherwise shaped for use in other appropriate applications. As shown in FIGS. 1–5, the plate 10 is prepared for use according to the invention by providing the plate with a multiplicity of smooth-walled perforations 12 which extend between the plate surfaces 10.1 and 10.2, see FIG. 5, the perforations 12 preferably being on the order of 25 microns in diameter and being spaced as closely together without overlapping or interconnection as is consistent with economical plate manufacture. The perforations can be formed in any suitable manner, as by drilling for example, but are preferably formed by the process of photoengraving, as illustrated in FIGS. 1 and 2, to achieve the desired multiplicity of suitably small and closely spaced plate perforations in an economical manner.

In the photoengraving process shown in FIGS. 1 and 2, wherein the plate 10 is formed of aluminum, the plate is coated on all sides with a photosensitive material 14 such as Photo Resist manufactured by the Eastman Kodak Company of Rochester, New York, which reacts in such a way when exposed to light as to render the material resistant to an etchant such as hydrochloric acid or sodium hydroxide, the etchant being adapted to dissolve aluminum. After coating, the plate is exposed to a light pattern, preferably on each of the plate surfaces 10.1 and 10.2, so that areas 14.1 of the material (shaded in FIG. 1) are exposed to the light and are thereby made resistant to the etchant, whereas unexposed areas 14.2 of the material remain unchanged and are adapted to be removed from the plate by the etchant or by other suitable treatment. As will be understood, the unexposed areas 14.2 of the material can be adapted to delineate the portions of the plate to be removed in forming the perforations 12 so that the plate can be thereafter submerged in an etchant such as hydrochloric acid or sodium hydroxide bath (not shown) for dissolving those areas of the plate 10 unprotected by the exposed, etchant-resistant material 14.1 to provide the plate with the desired multiplicity of perforations 12 shown in FIG. 5. Where plates other than an aluminum plate are utilized, for example, a magnesium plate, other photoengraving or similar processes can be used for providing the plate with the desired multiplicity of closely spaced perforations. Plate perforations formed by a photoengraving process will tend to be of other than the true cylindrical shape shown in FIGS. 5 and 6 but the engraving process can be easily regulated to control the shape of the perforations and to minimize variance of the perforation shape from the cylindrical so that any effect of perforations irregularities such as tapering will not be significant in utilizing the plate for its intended purpose as explained below.

After formation of the plate perforations 12, the plate can be treated in any suitable manner, for example in a suitable chemical bath, to smooth or polish the inner walls of the perforations 12, but preferably the plate is treated in an electrolytic process for this purpose as illustrated in FIG. 3. In such an electrolytic polishing process, the perforated aluminum plate 10 and an electrical conductor, such as the stainless steel member 16 for example, can be connected to a suitable power source, indicated by terminals 20, as anode and cathode respectively and can be submerged in an electrolyte 18, such as an electropolishing or brightening bath having an orthophosphoric-acid base, whereby the protruding irregularities of the plate and plate perforations will be removed in conventional manner.

Thereafter, after cleaning the plate if necessary, the perforated plate is treated for forming a coating of light or electromagnetic-energy transmitting material on the plate, such material comprising a compound of the material forming the plate. For example, the aluminum plate 10 can be anodized in conventional manner, for example by submerging the plate in a 15% solution of sulfuric acid at 70° Fahrenheit for 30 minutes while imposing a potential difference of twelve volts D.C. between the plate and a suitable cathode. In this manner, the exposed surfaces of the plate including the smooth inner walls of the plate perforations 12 are coated with a thin layer of aluminum oxide 21 having an index of refraction of approximately 1.75 as shown in FIGS. 6 and 7. Although the method herein described provides a device having an aluminum matrix 10, plates of other materials such as magnesium, silver or other suitable materials can be treated in corresponding manner for providing the plates with smooth-walled perforations and for lining the plate perforations with magnesium oxide or silver chloride or other energy-transmitting materials.

Then, as shown in FIGS. 8 and 9, the plate perforations are filled with a light or electromagnetic-energy transmitting material 22 having an index of refraction higher than that of the material 21 lining the plate perforations. For example, a melted glass having a refractive index substantially higher than that of aluminum oxide can be poured over the perforated aluminum plate 10 so that the glass material flows into and fills each of the plate perforations 12 as shown in FIGS. 8 and 9. For manufacturing a device adapted to transmit an image projected by means of infra-red energy, glasses having a high arsenic content such as arsenic sulfide, arsenic trisulfide, arsenic selenide and arsenic telluride are preferred, these glasses having an index of refraction well above that of aluminum oxide and having their transmittance properties limited primarily to the infra-red region of the electromagnetic spectrum. Preferably an arsenic trisulfide glass of approximately 60% arsenic content is used, such a glass having an index of refraction of approximately 3.4 and having a coefficient of thermal expansion corresponding to that of the coated aluminum plate 10. It should be understod that other conventional methods of filling the plate perforations with the material 22 are within the scope of this invention. For example, the plate could be partially submerged in molten glass for permitting filling of the plate perforations by capillary action in a well-known manner.

After filling of the plate perforations, the plate surfaces 10.1 and 10.2 can be abraded, for example, by passing the plate between spaced, rotating grinding wheels 24 as is diagrammatically illustrated in FIG. 10, thereby to remove the excess material 22 extending outside the plate perforations 12 and to optically finish the material 22 within the perforations at each end of the perforations, as shown at 22.1 and 22.2 in FIG. 10, so that the material filling the perforations is provided with a fiber-like configuration and is adapted to receive and to transmit infra-red or other electromagnetic energy therethrough. In the abrading process, it is not necessary to remove oxides or other compounds formed on the plate surfaces except as required by the mechanics of the abrading technique, an aluminum oxide coating on the plate surfaces serving as a protective coating for an aluminum plate as is well known.

As shown in FIGS. 11 and 12, the image transmitting device 26 produced according to the above-described method of manufacture can be modified in appropriate manner to be used in various applications. For example, the device 26 can be provided with a concave spherical surface 26a and a flat surface 26b in any conventional manner and can be incorporated in an optical system 28 to serve as a field flattener. Such an optical system can include a flat object plane, represented by the dotted line 30, in which an object, represented by the arrow 32, can be disposed, and can include an objective lens 34 which is adapted to project an image of the object 32, as at 32a, in the image field of the lens, the image field of the lens being indicated herein by the dotted line 36. For example, where the object 32 comprises a heated body situated in darkness at a distance from the lens 34, the lens can comprise an infra-red transmitting lens adapted to project an infra-red image of the object in the image field. As will be readily understood, the image field of the lens can have a curvature determined by the optical characteristics of the lens, and the surface 26a of the image transmitting device 26 provided by this invention can have a curvature corresponding thereto. The device 26 is arranged within such an optical system with its curved surface 26a coincident with the image field 36 so that each portion of the image projected in the field by the lens 34 will be properly focused on said device surface 26a. The device 26 includes a multiplicity of fiber-like, energy-transmitting members 22a which are each adapted to receive light, infra-red or other electromagnetic energy from respective portions of the object image appearing on the curved image field 36 and which are adapted to transmit said light or energy therethrough to reproduce the image in mosaic form upon the flat surface 26b of the device.

In accordance with the objects of this invention, the device 26 includes a multiplicity of the fiber-like members 22a each of which is provided with an optically insulating coating 21a and which is securely mounted within a suitably strong and secure matrix 10a. The insulating coatings 21a comprise compounds of the material forming the matrix 10a and therefore will not tend to separate or fall from within the matrix; the coatings 21a are formed within smooth-walled perforations so that the interface between the coatings 21a and the members 22a will be smooth and regular thereby providing smooth, reflective peripheral surfaces on the peripheral surfaces of the members to assure efficient image transmission through the members by internal reflection; and since the members 22a are formed in situ within the coatings 21a and preferably have thermal expansion characteristics corresponding to those of the matrix 10a, if not to the characteristics of the coatings 21a, the members and coatings can be formed in contact over the entire peripheral surfaces of the members and will be securely held within the matrix.

Further, materials having their transmission properties primarily restricted to the infra-red region of the electromagnetic spectrum, for example the noted glasses of high arsenic content which soften at temperatures on the order of 210° C. and which tend to vaporize at relatively low temperatures, can be provided with appropriate optically-insulating coatings, such as aluminum and magnesium oxide which melt at relatively high temperatures above 2000° C., in a convenient and inexpensive manner according to the methods of this invention.

It should be understood, of course, that the illustrated application of the use of the device 26 does not comprise a limitation upon the invention disclosed herein, the device being useful for tube faceplates, etc., or wherever an image transmitting device is required. All modifications and equivalents of the described device and method of manufacturing the device which fall within the scope of the appended claims are included in this invention.

Having described our invention, we claim:

1. A method of making an image transmitting means of the character described, said method comprising as steps: providing an aluminum plate having a pair of opposite surfaces and having a multiplicity of smooth-walled perforations extending between said surfaces; anodizing the plate for coating said perforation walls with aluminum oxide; filling said perforations with a material which is adapted to transmit electromagnetic energy and which has an index of refraction higher than that of said aluminum oxide; and abrading said plate surfaces for optically finishing said filling material at each end of said perforations thereby to facilitate reception of said energy therein.

2. A method of making an image transmitting means of the character described, said method comprising as steps: providing a magnesium plate having a pair of opposite surfaces and having a multiplicity of smooth-walled perforations extending between said surfaces; oxidizing the plate for coating said perforation walls with magnesium oxide; filling said perforations with a material which is adapted to transmit electromagnetic energy and which has an index of refraction higher than that of said magnesium oxide; and abrading said plate surfaces for optically finishing said filling material at each end of said perforations; thereby to facilitate reception of said energy therein.

3. A method of making an infra-red image transmitting means of the character described, said method comprising as steps: providing a metallic plate having a pair of opposite surfaces; photoengraving said plate for forming a multiplicity of perforations which extend between said surfaces; treating the plate for smoothing the inner walls of said plate perforations; treating the plate for coating said perforation walls with a material which comprises a compound of the material embodied in said plate, which is adapted to transmit electromagnetic energy, and which has a relatively low index of refraction; filling said perforations with glass material of high arsenic content which has its transmittance properties primarily restricted to the infra-red region of the electromagnetic spectrum, which has thermal expansion characteristics corresponding to those of said plate, and which has an index of refraction higher than that of said coating material; and abrading said plate surfaces for optically finishing said glass material at each end of said perforations, thereby to facilitate reception of infra-red energy therein.

4. A method of making an infra-red image transmitting means of the character described, said method comprising as steps: providing an aluminum plate having a pair of opposite surfaces; photoengraving said plate for forming a multiplicity of perforations which extend between said surfaces; treating the plate for smoothing the inner walls of said perforations; anodizing the plate for coating said perforation walls with aluminum oxide; filling said perforations with arsenic trisulfide glass which has its transmittance properties primarily restricted to the infrared region of the electromagnetic spectrum and which has an index of refraction higher than that of said aluminum oxide; and abrading said plate surfaces for optically finishing said glass at each end of said perforations, thereby to facilitate reception of said infra-red energy therein.

5. A method of making an infra-red image transmitting means of the character described, said method comprising as steps: providing a magnesium plate having a pair of opposite surfaces; photoengraving said plate for forming a multiplicity of perforations which extend between said surfaces; treating the plate for smoothing the inner walls of said perforations; oxidizing the plate for coating said perforation walls with magnesium oxide filling said perforations with arsenic trisulfide glass which has its transmittance properties primarily restricted to the infra-red region of the electromagnetic spectrum and which has an index of refraction higher than that of said magnesium oxide; and abrading said plate surfaces for optically finishing said glass at each end of said perforations, thereby to facilitate reception of said infra-red energy therein.

References Cited by the Examiner
UNITED STATES PATENTS

| | | | |
|---|---|---|---|
| 2,311,704 | 2/1943 | Simison | 29—411 |
| 2,328,302 | 8/1943 | Simison | 29—424 |
| 2,550,328 | 4/1951 | Cohn | 148—6.27 |
| 2,825,260 | 3/1958 | O'Brien | 88—1 |
| 2,885,273 | 5/1959 | Oelgoetz et al. | 148—6.27 |
| 2,929,922 | 3/1960 | Schawlow et al. | 88—61 |
| 2,992,586 | 7/1961 | Upton | 88—1 |

OTHER REFERENCES

Armour et al.: "Infrared Fiber Optics," received by ASTIA, April 20, 1960, pages 1–7 relied on.

JEWELL H. PEDERSEN, *Primary Examiner.*

EMIL G. ANDERSON, *Examiner.*